United States Patent
Clark et al.

(10) Patent No.: US 8,706,967 B1
(45) Date of Patent: *Apr. 22, 2014

(54) CACHE MANAGEMENT SYSTEM AND METHOD

(71) Applicant: EMC Corporation, Hopkinton, MA (US)

(72) Inventors: Roy E. Clark, Hopkinton, MA (US); Robert C. Solomon, Kensington, NH (US); Robert W. Beauchamp, Littleton, MA (US); Humberto Rodriguez, Williamsburg, MA (US); John M. Hayden, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,796

(22) Filed: May 1, 2013

Related U.S. Application Data

(63) Continuation of application No. 12/488,170, filed on Jun. 19, 2009, now Pat. No. 8,452,924.

(51) Int. Cl.
*G06F 12/00* (2006.01)

(52) U.S. Cl.
USPC ................. 711/118; 711/104; 711/135

(58) Field of Classification Search
USPC ................................ 711/118, 104, 135
See application file for complete search history.

(56) References Cited

U.S. PATENT DOCUMENTS

2008/0091895 A1* 4/2008 Chen ........................ 711/162
2008/0177805 A1* 7/2008 Kushwah et al. ......... 707/203

* cited by examiner

*Primary Examiner* — Yong Choe
(74) *Attorney, Agent, or Firm* — Brian J. Colandreo; Mark H. Whittenberger; Holland & Knight LLP

(57) ABSTRACT

A method, computer program product, and cache management system for receiving an indication of a data portion update within an electromechanical storage system. Information concerning the data portion update is provided to at least one proprietary, solid-state, non-volatile, cache memory system. The proprietary, solid-state, non-volatile, cache memory system is associated with at least a first of a plurality of computing devices and is not associated with at least a second of the plurality of computing devices.

20 Claims, 3 Drawing Sheets

CACHE MANAGEMENT SYSTEM AND METHOD

RELATED APPLICATIONS

The subject application is a continuation application of U.S. patent application with Ser. No. 12/488,170, filed on Jun. 19, 2009, the entire content of which is herein incorporated by reference.

TECHNICAL FIELD

This disclosure relates to storage networks and, more particularly, to cache management processes within a storage network.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). An NAS may be a stand-alone, network-accessible, hard disk storage system that may provide file-level access to electronic data. A SAN array may be a dedicated storage system that may connect numerous storage resources to one or many servers. A SAN may provide block-level access to electronic data through one or more SCSI-based protocols (e.g., Fiber Channel and iSCSI).

SUMMARY OF DISCLOSURE

In a first implementation, a computer-implemented method includes receiving an indication of a data portion update within an electromechanical storage system. Information concerning the data portion update is provided to at least one proprietary, solid-state, non-volatile, cache memory system. The proprietary, solid-state, non-volatile, cache memory system is associated with at least a first of a plurality of computing devices and is not associated with at least a second of the plurality of computing devices.

One or more of the following features may be included. The data portion update may be indicative of new data being written to the electromechanical storage system. The new data may be written to the at least one proprietary, solid-state, non-volatile, cache memory systems. The data portion update may be indicative of updated data being written to the electromechanical storage system. The updated data may be written to the at least one proprietary, solid-state, non-volatile, cache memory systems.

Providing information concerning the data portion update to at least one proprietary, solid-state, non-volatile, cache memory system may include sending an invalidate notification providing to the at least one proprietary, solid-state, non-volatile, cache memory system. Providing information concerning the data portion update to at least one proprietary, solid-state, non-volatile, cache memory system may include providing new/updated data to the at least one proprietary, solid-state, non-volatile, cache memory system.

The at least one proprietary, solid-state, non-volatile, cache memory system may be a flash-based cache memory system.

In another implementation, a computer program product resides on a computer readable medium that has a plurality of instructions stored on it. When executed by a processor, the plurality of instructions cause the processor to perform operations including receiving an indication of a data portion update within an electromechanical storage system. Information concerning the data portion update is provided to at least one proprietary, solid-state, non-volatile, cache memory system. The proprietary, solid-state, non-volatile, cache memory system is associated with at least a first of a plurality of computing devices and is not associated with at least a second of the plurality of computing devices.

One or more of the following features may be included. The data portion update may be indicative of new data being written to the electromechanical storage system. The new data may be written to the at least one proprietary, solid-state, non-volatile, cache memory systems. The data portion update may be indicative of updated data being written to the electromechanical storage system. The updated data may be written to the at least one proprietary, solid-state, non-volatile, cache memory systems.

Providing information concerning the data portion update to at least one proprietary, solid-state, non-volatile, cache memory system may include sending an invalidate notification providing to the at least one proprietary, solid-state, non-volatile, cache memory system. Providing information concerning the data portion update to at least one proprietary, solid-state, non-volatile, cache memory system may include providing new/updated data to the at least one proprietary, solid-state, non-volatile, cache memory system.

The at least one proprietary, solid-state, non-volatile, cache memory system may be a flash-based cache memory system.

In another implementation, a computing system includes at least one processor and at least one memory architecture coupled with the at least one processor. A first software module is executed on the at least one processor and the at least one memory architecture. The first software module is configured to receive an indication of a data portion update within an electromechanical storage system. A second software module is executed on the at least one processor and the at least one memory architecture. The second software module is configured to provide information concerning the data portion update to at least one proprietary, solid-state, non-volatile, cache memory system. The proprietary, solid-state, non-volatile, cache memory system is associated with at least a first of a plurality of computing devices and is not associated with at least a second of the plurality of computing devices.

One or more of the following features may be included. The data portion update may be indicative of new data being written to the electromechanical storage system. The data portion update may be indicative of updated data being written to the electromechanical storage system.

Providing information concerning the data portion update to at least one proprietary, solid-state, non-volatile, cache memory system may include sending an invalidate notification providing to the at least one proprietary, solid-state, non-volatile, cache memory system. Providing information concerning the data portion update to at least one proprietary, solid-state, non-volatile, cache memory system may include providing new/updated data to the at least one proprietary, solid-state, non-volatile, cache memory system.

The at least one proprietary, solid-state, non-volatile, cache memory system may be a flash-based cache memory system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
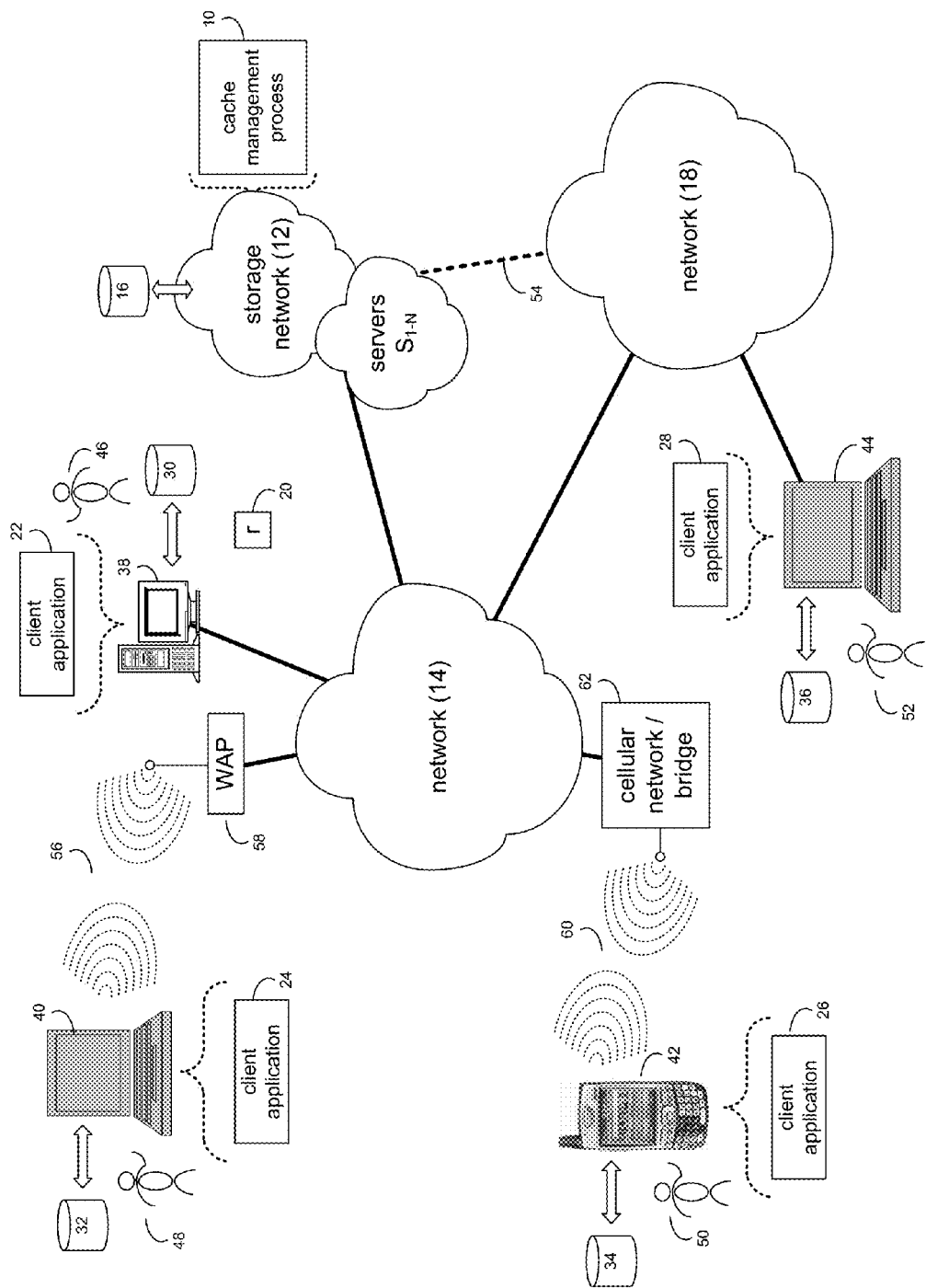
FIG. 1 is a diagrammatic view of a storage network and a cache management process coupled to a distributed computing network.

System Overview:

Referring to FIG. 1, there is shown cache management process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, cache management process 10 may receive an indication of a data portion update within an electromechanical storage system. Information concerning the data portion update may be provided to at least one proprietary, solid-state, non-volatile, cache memory system. The proprietary, solid-state, non-volatile, cache memory system may be associated with at least a first of a plurality of computing devices and may not be associated with at least a second of the plurality of computing devices.

The instruction sets and subroutines of cache management process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Cache Management Process:

For the following discussion, client application 22 is going to be described for illustrative purposes. However, this is not intended to be a limitation of this disclosure, as other client applications (e.g., client applications 24, 26, 28) may be equally utilized.

Figure 2:
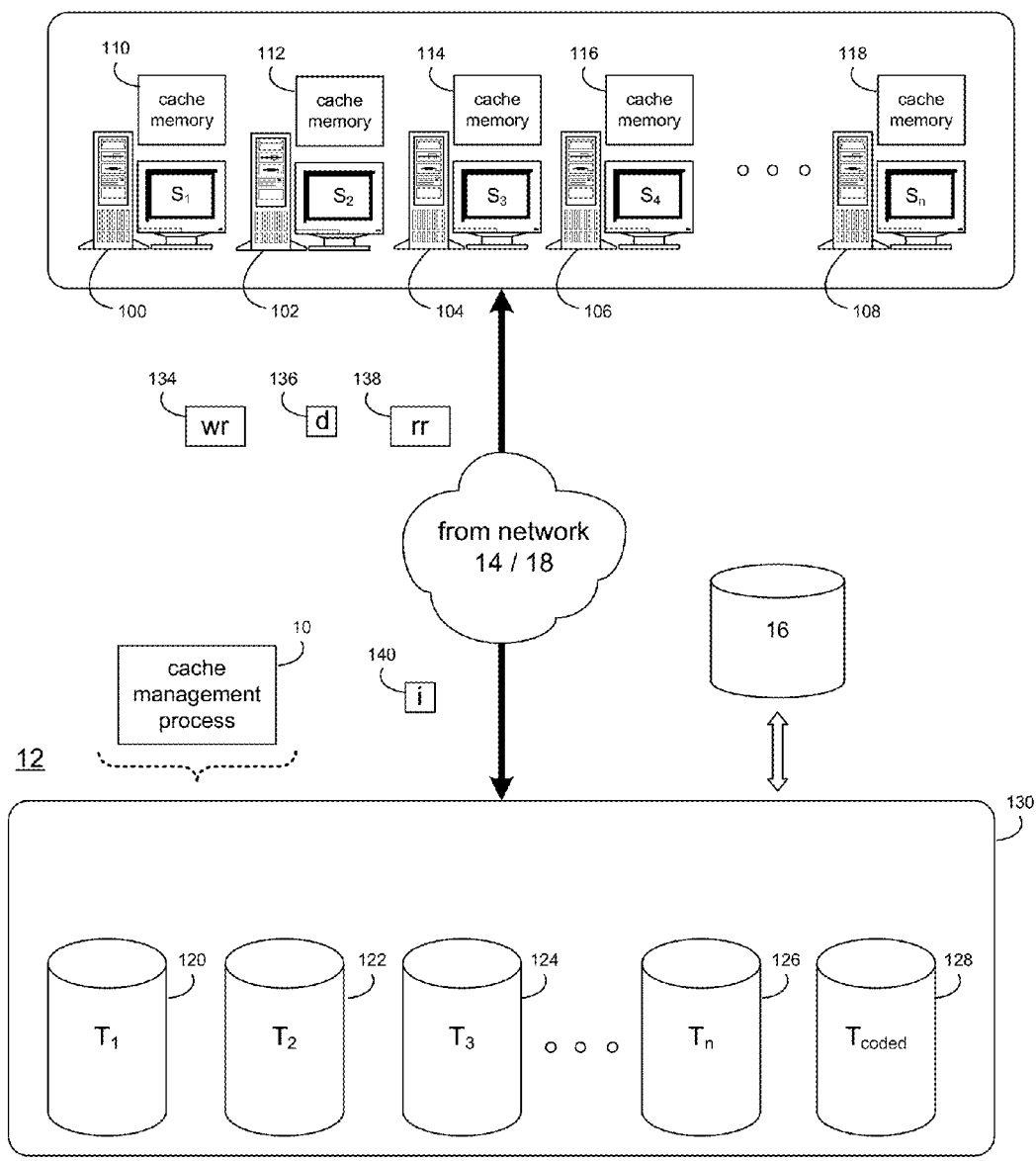
FIG. 2 is a diagrammatic view of the storage network of FIG. 1.

Referring also to FIG. 2, a plurality of server computers $S_{1-n}$ (e.g., server computers 100, 102, 104, 106, 108) may be coupled to network 14 and/or network 18. Server computers 100, 102, 104, 106, 108 may be coupled to network 14 and/or network 18 via e.g., a wireless connection or a hardwired connection. Server computers 100, 102, 104, 106, 108 may include an device that may perform the function of a server computer, example of which may include but are not limited to: freestanding server computers, desktop computers, workstation computers, and rackmount computers. Server computers 100, 102, 104, 106, 108 may execute one or more operating systems, examples of which may include but are not limited to: Microsoft Windows XP Server™; Novell Netware™; Redhat Linux™, Unix, or a custom operating system, for example.

While in this particular example, the plurality of server computers is shown to be five server computers (e.g. server computers 100, 102, 104, 106, 108), this is for illustrative purposes only and is not intended to be a limitation of this disclosure. Specifically, the actual number of server computers may be increased or decreased depending upon e.g. the level of redundancy/performance/capacity required.

Server computers 100, 102, 104, 106, 108 may each be coupled to a proprietary cache memory system (e.g., proprietary cache memory systems 110, 112, 114, 116, 118, respectively). Examples of proprietary cache memory systems 110, 112, 114, 116, 118 may include but are not limited to: flash-based, non-volatile, solid-state, cache memory systems. These proprietary cache memory systems may be incorporated within a server computer or external to a server computer. For example, if incorporated into a server computer, a proprietary cache memory system may be mounted to the system board of the server computer. Alternatively, the proprietary cache memory systems may be included within an accessory card (e.g., a PCI card) installed within the server computer. If mounted external to a server computer, the proprietary cache memory system may be directly coupled to the server computer system via e.g., a high-speed USB or FireWire port. Alternatively, the proprietary cache memory system may be remotely coupled to a server computer via e.g., a copper or fiber network connection. Additionally, while proprietary cache memory systems 110, 112, 114, 116, 118 are shown as discrete systems, this is for illustrative purposes only and is not intended to be a limitation of this disclosure, as other configurations are possible. For example, proprietary cache memory systems 110, 112, 114, 116, 118 may be housed in a single network-accessible enclosure, thus enabling proprietary cache memory systems 110, 112, 114, 116, 118 to share a power supply and network connection.

Typically, proprietary cache memory systems 110, 112, 114, 116, 118 are configured so that each proprietary cache memory system 110, 112, 114, 116, 118 is accessible by only a single computer. For example, proprietary cache memory system 110 may be configured to only be accessible by server computer 100; proprietary cache memory system 112 may be configured to only be accessible by server computer 102; proprietary cache memory system 114 may be configured to only be accessible by server computer 104; proprietary cache memory system 116 may be configured to only be accessible by server computer 106; and proprietary cache memory system 108 may be configured to only be accessible by server computer 108. However, other configurations are possible and are considered to be within the scope of this disclosure. For example, one or more of proprietary cache memory systems 110, 112, 114, 116, 118 may be configured so that they are accessible by multiple servers. For example, five proprietary cache memory systems may be configured to service ten server computers, wherein each of the five proprietary cache memory systems is accessible by two of the server computers.

Storage network 12 may include a plurality of storage targets $T_{1-n}$ (e.g. storage targets 120, 122, 124, 126). Storage targets 120, 122, 124, 126 may be configured to provide various levels of performance and/or high availability. For example, one or more of storage targets 120, 122, 124, 126 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 120, 122, 124, 126 may be configured as a RAID 1 array, in which data is mirrored between storage targets. By mirroring data between storage targets, a level of high availability is achieved as multiple copies of the data are stored within storage network 12.

While in this particular example, storage network 12 is shown to include four storage targets (e.g. storage targets 120, 122, 124, 126), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 128. As is known in the art, a coded target may be used to store coded data that may allow for the regeneration of data lost/corrupted on one or more of storage targets 120, 122, 124, 126. An example of such a coded target may include but is not limited to a hard disk drive that is used to store parity data within a RAID array.

While in this particular example, storage network 12 is shown to include one coded target (e.g., coded target 128), this is for illustrative purposes only and is not intended to be a limitation of this disclosure. Specifically, the actual number of coded targets may be increased or decreased depending upon e.g. the level of redundancy/performance/capacity required.

A combination of storage targets 120, 122, 124, 126 and coded target 128 may form non-volatile, electromechanical memory system 130.

The manner in which storage network 12 is implemented may vary depending upon e.g. the level of redundancy/performance/capacity required. For example, storage network 12 may be a RAID device and storage targets 120, 122, 124, 126 and/or coded target 128 are individual "hot-swappable" hard disk drives. An example of such a RAID device may include but is not limited to an NAS device. Alternatively, storage network 12 may be configured as a SAN, in which each of storage targets 120, 122, 124, 126 and/or coded target 128 may be a RAID device and/or computer-based hard disk drive. Further still, one or more of storage targets 120, 122, 124, 126 and/or coded target 128 may be a SAN.

In the event that storage network 12 is configured as a SAN, the various components of storage network 12 may be coupled using a network infrastructure (e.g., network 14 and/or network 18), examples of which may include but are not limited to an Ethernet (e.g., Layer 2 or Layer 3) network, a fiber channel network, an InfiniBand network, or any other circuit switched/packet switched network.

Logic (not shown) included within storage network 12 may execute all or a portion of cache management process 10. For example, the instruction sets and subroutines of cache management process 10, which may be stored on a storage device (e.g., storage device 16) coupled to storage network 12, may be executed by one or more processors (not shown) and one or more memory architectures (not shown) included within storage network 12. Storage device 16 may include but is not limited to: a hard disk drive; a tape drive; an optical drive; a RAID device; a random access memory (RAM); and a read-only memory (ROM).

As discussed above, various data requests (e.g. data request 20) may be sent from client applications 22, 24, 26, 28 to storage network 12, and examples of data request 20 may include but are not limited to data write request 134 (i.e. a request that data 136 be written to storage network 12) and data read request 138 (i.e. a request that data extent 136 be read from storage network 12). Additionally/alternatively, these data requests (e.g., data write request 134 and data read request 138) may be generated by one or more of server computers 100, 102, 104, 106, 108 in response to e.g., interactions with client applications 22, 24, 26, 28.

As discussed above and as will be discussed below in greater detail, cache management process 10 may receive an indication of a data portion update within an electromechanical storage system. Information concerning the data portion update may be provided to at least one proprietary, solid-state, non-volatile, cache memory system. The proprietary, solid-state, non-volatile, cache memory system may be associated with at least a first of a plurality of computing devices and may not be associated with at least a second of the plurality of computing devices.

Assume for illustrative purposes that data write request 134 is generated by server computer 100, requesting that data 136 be written to non-volatile, electromechanical memory system 130 at address LBA1000 (i.e., Logical Block Address 1000). For this example, data 136 may represent new data (e.g., data that was not previously written to non-volatile, electromechanical memory system 130) or updated data (e.g., a revised version of data previously written to non-volatile, electromechanical memory system 130).

Figure 3:
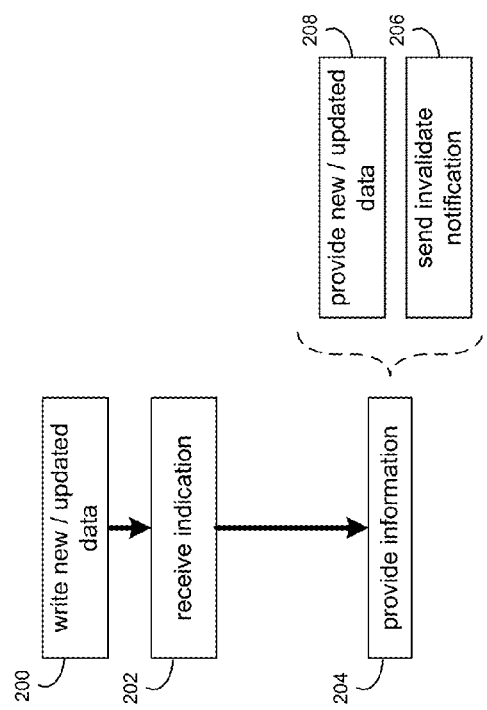
FIG. 3 is a flowchart of a data write process executed by the cache management process of FIG. 1.

Referring also to FIG. 3, server computer 100 may process the LBA1000 address (associated with data 136) to define a target location (e.g., a cache memory page) within proprietary cache memory system 110 for storing data 136. An example of the manner in which server computer 100 may process the LBA1000 address is via a hashing algorithm. Examples of such a hashing algorithm include SHA1 and Simple XOR Address Folding. Server computer 100 may then store data 136 within proprietary cache memory system 110 at the address defined in the manner described above. Additionally, cache management process 10 may store data 136 within non-volatile, electromechanical memory system 130 at the address LBA1000.

While the following discussion concerns data 136 being received by server computer 100 and written to proprietary cache memory system 110, this is for illustrative purposes only and is not intended to be a limitation of this disclosure, as other configurations are possible. For example, data 136 may be received by any of the server computers and, therefore, stored within any of the proprietary cache memory systems.

Upon receiving 202 an indication of the receipt of data 136 for storage within non-volatile, electromechanical memory system 130, cache management process 10 may provide 204 information 140 concerning the receipt of data 136 to one or more of proprietary cache memory systems 110, 112, 114, 116, 118.

Specifically, as each of proprietary cache memory systems 110, 112, 114, 116, 118 provides caching services for the same non-volatile, electromechanical memory system 130, cache management process 10 may provide 204 information 140 concerning the receipt of data 136 for storage within non-volatile, electromechanical memory system 130 to (in this example) cache memory systems 112, 114, 116, 118. Assume for illustrative purposes that data 136 is updated data (e.g., a revised version of data previously written to non-volatile, electromechanical memory system 130). Accordingly, assume that an older version of data 136 had been previously written to non-volatile, electromechanical memory system 130. Further, assume that each of server computers 100, 102, 104, 106, 108 accessed this older version of data 136 and, therefore, has a copy of the older version of data 136 resident in the respective proprietary cache memory systems 110, 112, 114, 116, 118. Additionally, assume that an application accessed the older version of data 136 via server computer 100 and this older version of data 136 was revised and saved by server computer 100.

Accordingly and as discussed above, server computer 100 may store the revised version of data 136 within proprietary cache memory system 110 at an address calculated in the manner described above (e.g., with a hashing algorithm). Further, cache management process 10 may store the revised version of data 136 at address LBA1000 within non-volatile, electromechanical memory system 130. Accordingly, proprietary cache memory system 110 and non-volatile, electromechanical memory system 130 would each have the revised version of data 136. Unfortunately, proprietary cache memory systems 112, 114, 116, 118 would each have the older version of data 136.

Accordingly, cache management process 10 may provide 204 information 140 concerning the receipt and storage of the revised version of data 136 to (in this example) proprietary cache memory systems 112, 114, 116, 118. The information may be provided 204 as a broadcast (simultaneously to all of proprietary cache memory systems 112, 114, 116, 118) or a plurality of unicasts (individually to each of proprietary cache memory systems 112, 114, 116, 118.

When providing 204 information 140, cache management process 10 may send 206 an invalidate notification concerning the data stored at non-volatile, electromechanical memory system 130. Specifically and for the reasons discussed above, the version of data 136 stored within proprietary cache memory systems 112, 114, 116, 118 is invalid, in that it represents an older version of data 136 (as opposed to the updated version of data 136 stored within proprietary cache memory system 110 and non-volatile, electromechanical memory system 130. Accordingly, information 140 provided to proprietary cache memory systems 112, 114, 116, 118 may provide notice that the version of data 136 stored within proprietary cache memory systems 112, 114, 116, 118 is invalid (as it is an older version) and that in the event of a read request being made for data 138, the updated version of the data should be obtained from address LBA1000 of non-volatile, electromechanical memory system 130.

Additionally/alternatively, when providing 204 information 140 to proprietary cache memory systems 112, 114, 116, 118, cache management process 10 may be configured to provide 208 the updated version of data 136 to proprietary cache memory systems 112, 114, 116, 118 so that proprietary cache memory systems 112, 114, 116, 118 may be updated to reflect the latest version of data 136. As discussed above, data 136 may be indicative of updated or new data. In the event that data 136 represents new data, the data provided 208 to proprietary cache memory systems 112, 114, 116, 118 would be representative of the new data. Again, cache management process 10 may use the new data to update proprietary cache memory systems 112, 114, 116, 118.

While server computer 100 is described above as processing the LBA1000 address (associated with data 136) to define a target location (e.g., a cache memory page) within proprietary cache memory system 110, this is for illustrative purposes only and is not intended to be a limitation of this disclosure, as other configurations are possible and are consider to be within the scope of this disclosure. For example, cache management process 10 may process the LBA1000 address (associated with data 136) upon receiving 202 the indication of the receipt of data 136 for storage within non-volatile, electromechanical memory system 130. Accordingly, when server computer 100 receives data 136, the data may be temporarily stored (e.g., in a buffer). Upon receiving 202 an indication of the receipt of data 136 for storage within non-volatile, electromechanical memory system 130, cache management process 10 may process the LBA1000 address to define a target location (e.g., a cache memory page) within proprietary cache memory system 110 for storing data 136. When cache management process 10 provides 204 information 140 to proprietary cache memory systems 112, 114, 116, 118, information 140 may also be provided to proprietary cache memory systems 110 and may define the target location (e.g., a cache memory page) within proprietary cache memory system 110 for storing data 136.

Additionally, while server computer 100 is described above as effectuating the storage of data 136 within proprietary cache memory system 110, this is for illustrative purposes only and is not intended to be a limitation of this disclosure, as other configurations are possible. For example, cache management process 10 may be configured to store 200 data 136 within one or more of proprietary cache memory systems 112, 114, 116, 118.

While proprietary cache memory systems 112, 114, 116, 118 are described above as being incorporated into server computers 100, 102, 104, 106, 108 (respectively), this is for illustrative purposes only and is not intended to be a limitation of this disclosure, as other configurations are possible. For example, proprietary cache memory systems may be included within one or more of client electronic devices 38, 40, 42, 44 and may be configured to effectuate the functionality described above.

A number of implementations have been described. Nevertheless, it will be understood that various modifications may be made. Accordingly, other implementations are within the scope of the following claims.

What is claimed is:

1. A computer-implemented method comprising:
receiving an indication of a data portion update within an electromechanical storage system from a first proprietary, solid-state, non-volatile, cache memory system; and
providing information concerning the data portion update to a second proprietary, solid-state, non-volatile, cache memory system, wherein the first proprietary, solid-state, non-volatile, cache memory system is associated with at least a first of a plurality of computing devices and is not associated with at least a second of the plurality of computing devices;
wherein providing information concerning the data portion update to the second proprietary, solid-state, non-volatile, cache memory system includes sending an invalidate notification indicating the data stored to the second proprietary, solid-state, non-volatile, cache memory system associated with at least the second of the plurality of computing devices is invalid.

2. The computer-implemented method of claim 1 wherein the data portion update is indicative of new data being written to the electromechanical storage system.

3. The computer-implemented method of claim 2 further comprising:
writing the new data to the first proprietary, solid-state, non-volatile, cache memory system.

4. The computer-implemented method of claim 1 wherein the data portion update is indicative of updated data being written to the electromechanical storage system.

5. The computer-implemented method of claim 4 further comprising:
writing the updated data to the first proprietary, solid-state, non-volatile, cache memory system.

6. The computer-implemented method of claim 1 wherein providing information concerning the data portion update to the second proprietary, solid-state, non-volatile, cache memory system includes notifying the second proprietary, solid-state, non-volatile, cache memory system the data portion update is available from the electromechanical storage system.

7. The computer-implemented method of claim 1 wherein providing information concerning the data portion update to the second proprietary, solid-state, non-volatile, cache memory system includes:
providing one of new data and updated data to the second proprietary, solid-state, non-volatile, cache memory system.

8. The computer-implemented method of claim 1 wherein the first proprietary, solid-state, non-volatile, cache memory system is a flash-based cache memory system.

9. A computer program product residing on a non-transitory computer readable medium having a plurality of instructions stored thereon, which, when executed by a processor, cause the processor to perform operations comprising:
receiving an indication of a data portion update within an electromechanical storage system from a first proprietary, solid-state, non-volatile, cache memory system; and
providing information concerning the data portion update to a second proprietary, solid-state, non-volatile, cache memory system, wherein the first proprietary, solid-state, non-volatile, cache memory system is associated with at least a first of a plurality of computing devices and is not associated with at least a second of the plurality of computing devices;
wherein providing information concerning the data portion update to the second proprietary, solid-state, non-volatile, cache memory system includes sending an invalidate notification indicating the data stored to the second proprietary, solid-state, non-volatile, cache memory system associated with at least the second of the plurality of computing devices is invalid.

10. The computer program product of claim 9 wherein the data portion update is indicative of new data being written to the electromechanical storage system.

11. The computer program product of claim 10 further comprising:
writing the new data to the first proprietary, solid-state, non-volatile, cache memory system.

12. The computer program product of claim 9 wherein the data portion update is indicative of updated data being written to the electromechanical storage system.

13. The computer program product of claim 12 further comprising:
writing the updated data to the first proprietary, solid-state, non-volatile, cache memory system.

14. The computer program product of claim 9 wherein providing information concerning the data portion update to the second proprietary, solid-state, non-volatile, cache memory system includes notifying the second proprietary, solid-state, non-volatile, cache memory system the data portion update is available from the electromechanical storage system.

15. The computer program product of claim 9 wherein providing information concerning the data portion update to the second proprietary, solid-state, non-volatile, cache memory system includes:
providing one of new data and updated data to the second proprietary, solid-state, non-volatile, cache memory system.

16. A cache management system comprising:
at least one processor;

at least one memory architecture coupled with the at least one processor;

a first software module executed on the at least one processor and the at least one memory architecture, wherein the first software module is configured to receive an indication of a data portion update within an electromechanical storage system from a first proprietary, solid-state, non-volatile, cache memory system; and a second software module executed on the at least one processor and the at least one memory architecture, wherein the second software module is configured to provide information concerning the data portion update to a second proprietary, solid-state, non-volatile, cache memory system, wherein the first proprietary, solid-state, non-volatile, cache memory system is associated with at least a first of a plurality of computing devices and is not associated with at least a second of the plurality of computing devices;

wherein the second software module is configured to provide information concerning the data portion update to the second proprietary, solid-state, non-volatile, cache memory system, wherein providing includes sending an invalidate notification indicating the data stored to the second proprietary, solid-state, non-volatile, cache memory system associated with at least the second of the plurality of computing devices is invalid.

17. The cache management system of claim 16 wherein the data portion update is indicative of new data being written to the electromechanical storage system.

18. The cache management system of claim 16 wherein the data portion update is indicative of updated data being written to the electromechanical storage system.

19. The cache management system of claim 16 wherein providing information concerning the data portion update to the second proprietary, solid-state, non-volatile, cache memory system includes notifying the second proprietary, solid-state, non-volatile, cache memory system the data portion update is available from the electromechanical storage system.

20. The cache management system of claim 16 wherein providing information concerning the data portion update to the second proprietary, solid-state, non-volatile, cache memory system includes:

providing one of new data and updated data to the second proprietary, solid-state, non-volatile, cache memory system.

* * * * *